United States Patent [19]

Marrotta

[11] 4,384,740
[45] May 24, 1983

[54] GLARE SHIELD FOR AUTOMOBILES

[76] Inventor: Paul Marrotta, 5135 Coldwater Cyn., Sherman Oaks, Calif. 91423

[21] Appl. No.: 268,786

[22] Filed: Jun. 1, 1981

[51] Int. Cl.³ .............................................. B60J 3/02
[52] U.S. Cl. ................................................. 296/97 H
[58] Field of Search ............... 296/97 H, 97 K, 97 B, 296/97 R; 160/38.2, DIG. 3

[56] References Cited

U.S. PATENT DOCUMENTS 2,744,783  5/1956  Peavey ............................ 296/97 H
3,610,680 10/1971  Brady ............................. 296/97 H

FOREIGN PATENT DOCUMENTS 2741901  3/1979  Fed. Rep. of Germany .... 296/97 B

Primary Examiner—Robert R. Song

Attorney, Agent, or Firm—Charles E. Temko

[57] ABSTRACT

An automobile glare shield of visor type adapted to be mounted above a windshield having a rigid peripheral frame supporting an air filled envelope including a centrally disposed sheet of tinted synthetic resinous material enclosed therein. The envelope includes foam cushion members having openings therein overlying the tinted sheet, and an outer flexible cover having corresponding openings overlies the cushion material, the cover openings being closed by clear synthetic resinous material. In one embodiment, the clear synthetic resinous material is disposed underneath the openings in the cover, and in another embodiment, the clear synthetic resinous material overlies the cover. In each case, the closing of the edges of the cover allows the air filled envelope to collapse slowly under impact, thereby providing a cushion in the event of accident.

3 Claims, 5 Drawing Figures

GLARE SHIELD FOR AUTOMOBILES

BACKGROUND OF THE INVENTION

This invention relates generally to the field of automotive sun visors and more particularly to an improved form thereof in which a transparent tinted glare-inhibiting member is protectively sealed within a cushioned envelope which both protects the glare-inhibiting member, and forms a degree of protection against impact by the head of an occupant of a vehicle.

It is known in the art to provide padded sun visors of opaque type which provide a degree of cushioning in the event of an accident. While such devices provide adequate shielding from the sun during daytime driving, there offer little aid against glare emanating from approaching headlamps during nighttime driving.

Automotive glare shields per se, are also well known in the art, as exemplified by the Jacobs U.S. Pat. No. 2,160,504 granted May 30, 1939. Such shields offer considerable protection during nighttime driving, but inadequate protection during daytime driving against the strong rays of the sun.

A convertible sun shade and non-glare visor is disclosed in the Starczewski U.S. Pat. No. 3,754,810 granted Aug. 28, 1973. The disclosed device includes a transparent non-glare visor body having a removable flexible opaque cover which is mounted to entirely enclose the visor body when the visor body is not used to protect viewing against glare. The cover may be provided with a safety material to provide cushioning. Unfortunately, this device includes removable parts which must be carefully manipulated to change the function of the device, permiting the removable parts to become misplaced or damaged when not in use. Further, the necessary converting operation is often required at an inconvenient time.

SUMMARY OF THE INVENTION

Briefly stated, the invention contemplates the provision of an improved glare shield incorporated into a sun visor which incorporates the advantages of prior art constructions without accompanying disadvantages. The disclosed device includes a relatively rigid opaque frame defining a rectangularly shaped centrally disposed opening covered by a sheet of tinted anti-glare material, preferably of polarized type. Overlying the frame element on either side thereof are corresponding foam layers placed in congruent relation with corresponding openings. Overlying the foam laminae is a flexible cover element, again, with corresponding rectangular openings, and transparent planar members seal these openings against the entrance of soil, and prevent direct contact with the anti-glare member. The edges of the cover element are stitched or otherwise interconnected to provide a resilient cushion from which air may escape relatively slowly, the cushion restoring itself under the resilient action of the foam layers when externally applied pressure is removed.

BRIEF DESCRIPTION OF THE DRAWINGS

In the drawings, to which reference will be made in the specification, similar reference characters have been employed to designate corresponding parts throughout the several views.

DETAILED DESCRIPTION OF THE DISCLOSED EMBODIMENT

Figure 1:
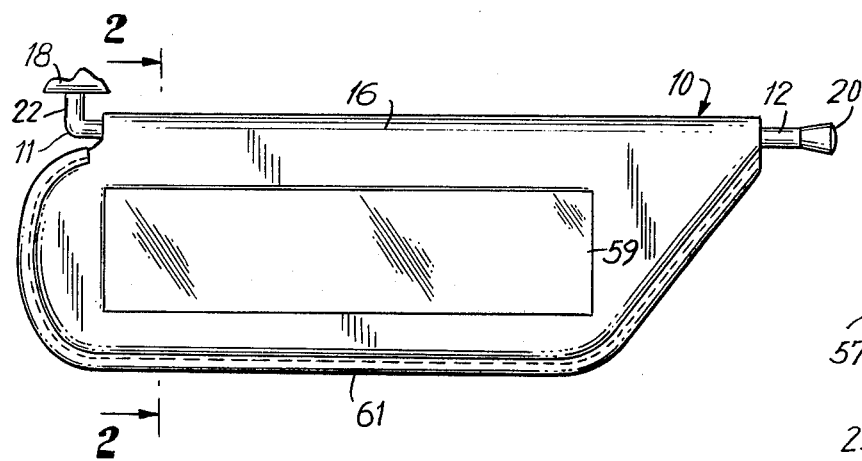
FIG. 1 is an elevational view of a first embodiment of the invention.
Figure 2:
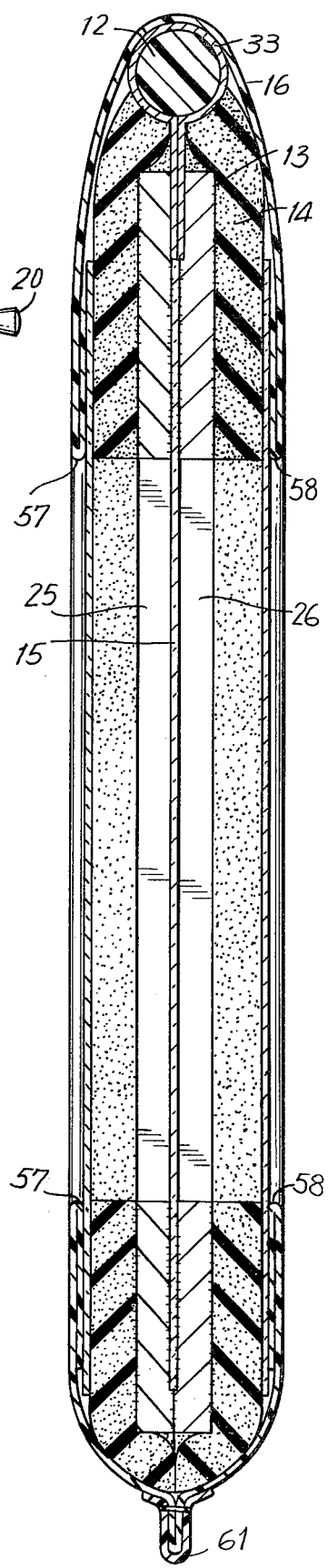
FIG. 2 is a vertical sectional view thereof, as seen from the plane 2—2 in FIG. 1.
Figure 3:
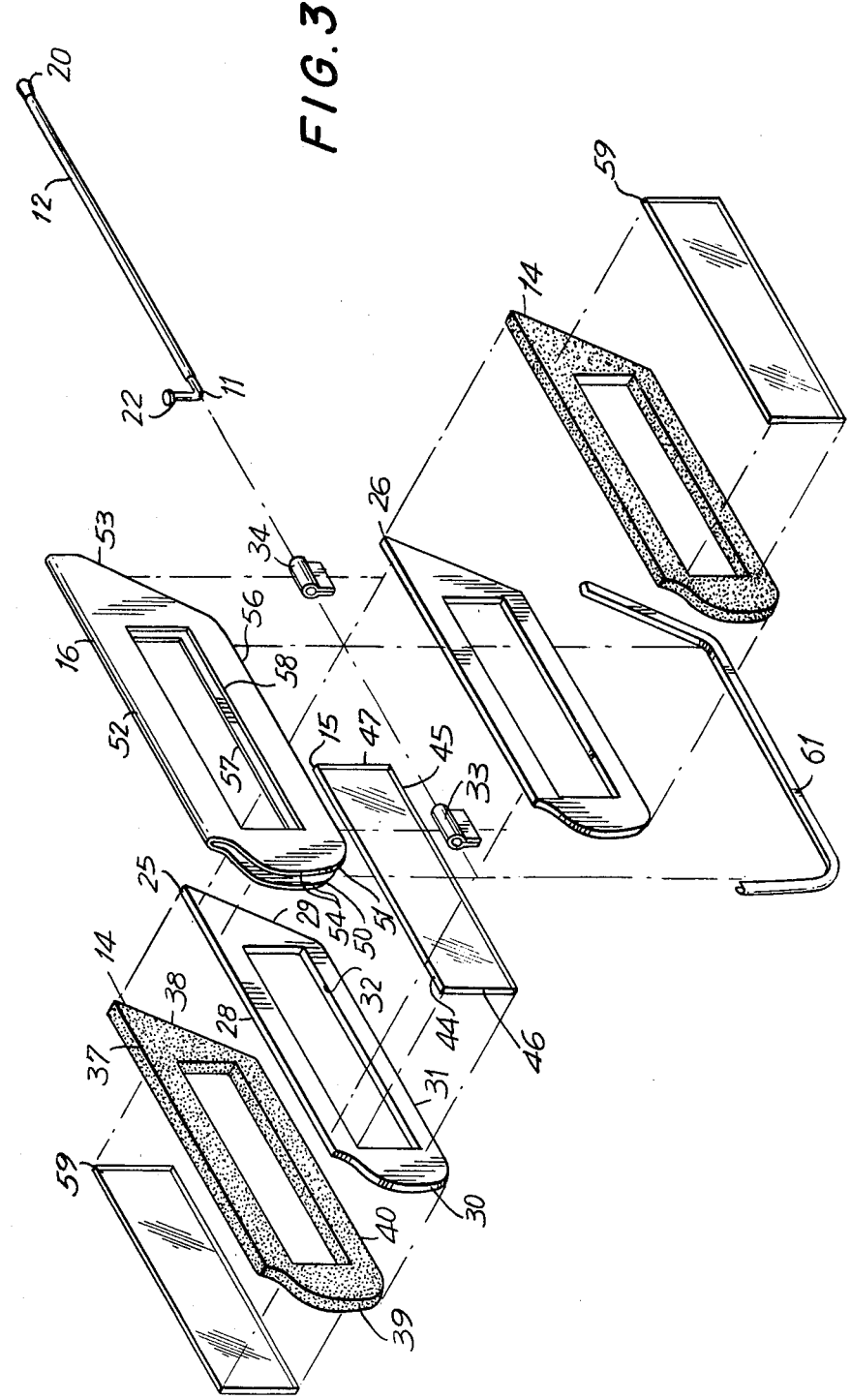
FIG. 3 is an exploded view in perspective thereof.

In accordance with the first embodiment of the invention, the device, generally indicated by reference character 10, comprises broadly: a support element 11, a pivoted rod element 12, a frame element 13, a foam cushion element 14, a glare shield element 15 and a cover element 16.

The support element 11 may be entirely conventional, including a bracket 18 which supports the rod element 12.

The rod element 12 includes a first end 20 engaging means not shown to enable the device to be pivoted about a substantially horizontal axis, as is well known in the art. A second end 22 may include a ball and socket permiting rotation of the device about a vertical axis, again, as is known in the art.

The frame element 13 preferably includes first and second members 25 and 26 of rigid planar material, each being bounded by an upper edge 28, an inner edge 29, an outer edge 30 and a lower edge 31. Rectangular openings 32 are generally centrally positioned and extend through the plane of the members 26 and 27. Clips 33 and 34, of well known type, enable the frame element to engage the rod element 12 for horizontal pivoting movement.

The foam cushion element 14 may be formed in one or two pieces, and includes corresponding upper edges 37, inner edges 38, outer edges 39 and lower edges 40.

The glare shield element 15 overlies the opening 32 in each of the members 26 and 27, and is preferably sandwiched therebetween. It is of synthetic resinous material of polarized type, and is bounded by side edges 44 and 45, as well as end edges 46 and 47.

The cover element 16 is of opaque synthetic resinous material, so as to conceal from view the foam cushion element, and may be of a single blank of material forming first and second laminae 50 and 51. The blank is bounded by an upper fold edge 52, inner edges 53, outer edges 54 and lower edges 56. Rectangular openings 57 and 58 overlie transparent acetate members 59 which in turn overlie the foam cushion element. A peripheral binding 61 may be applied by stitch means, as is known in the art, to result in a sealed envelope from which entrapped air may escape slowly under impact or compression, which envelope will restore itself by the expansion of the compressed foam cushion element when external pressure has been removed.

In use, the device is used during the daytime as a sunshield, it being possible for the driver to position his eyes such that the direct rays of the sun are obstructed by the opaque portions adjacent the periphery of the device. In the nighttime, the centrally disposed anti-glare shield prevents the driver from being dazzled by oncoming headlights, while permiting substantial nighttime viewing.

Figure 4:
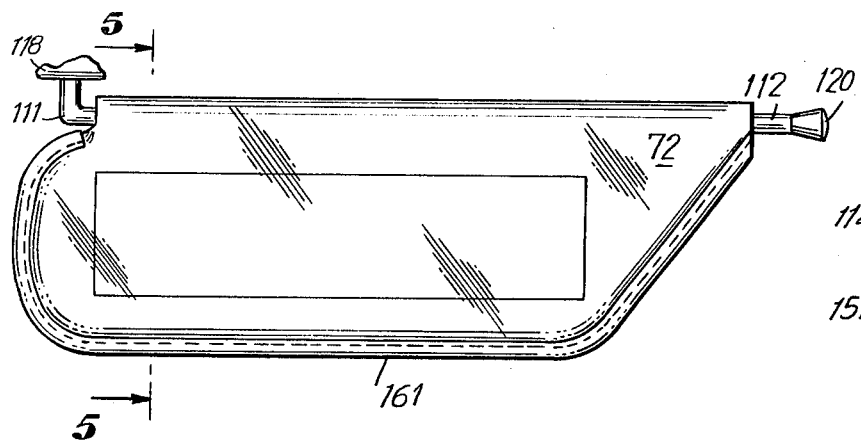
FIG. 4 is an elevational view of a second embodiment of the invention.
Figure 5:
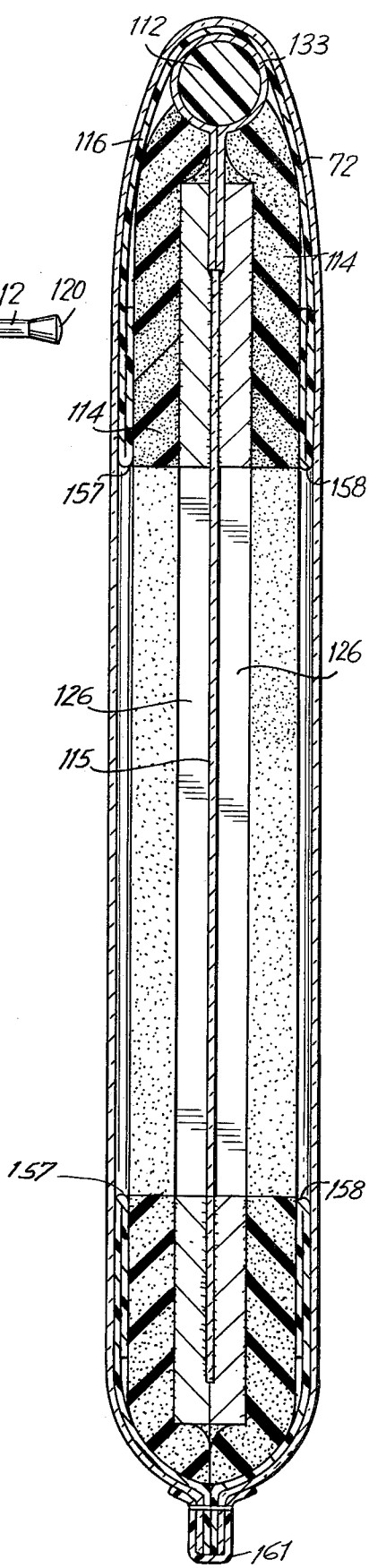
FIG. 5 is a vertical sectional view of the second embodiment as seen from the plane 5—5 in FIG. 1.

Turning now to the second embodiment of the invention, illustrated in FIGS. 4 and 5, and generally indicated by reference character 70, parts corresponding to those of the first embodiment have been designated by similar reference characters with the additional prefix "1".

In the second embodiment, the acetate windows 59 and 60 are eliminated, and an outer vinyl sleeve 72 overlies the cover element 116. While this construction offers greater flexibility, and improved resistance to scratching, the degree of vision offered is not quite as clear as with the acetate members.

I wish it to be understood that I do not consider the invention limited to the precise details of structure shown and set forth in this specification, for obvious modifications will occur to those skilled in the art to which the invention pertains.

I claim:

1. An automobile visor type glare shield comprising: a support element, a pivoted rod element, a planar frame element of relatively rigid material having means for pivotal engagement with said rod element at an upper edge thereof, said frame element having a through opening therein and a transparent glare shield element positioned to overlie said opening; a pair of planar foam cushion elements of configuration corresponding to said frame element overlying said frame element in substantially congruent relation, and a cover element of flexible planar material overlying said cushion element to enclose the same; said cover element having corresponding openings overlying those in said foam cushion and frame elements, and clear planar material overlying said openings in said cover element to form an enclosed envelope from which air may slowly escape under externally applied pressure.

2. A glare shield in accordance with claim 1, further characterized in said clear planar material being cellulose acetate and disposed within said cover element.

3. A glare shield in accordance with claim 1, further characterized in said clear planar material being flexible vinyl and overlying said cover element.

* * * * *